July 31, 1945.  G. P. GITS  2,380,515
THERMOPLASTIC CONSTRUCTION
Original Filed Dec. 14, 1940
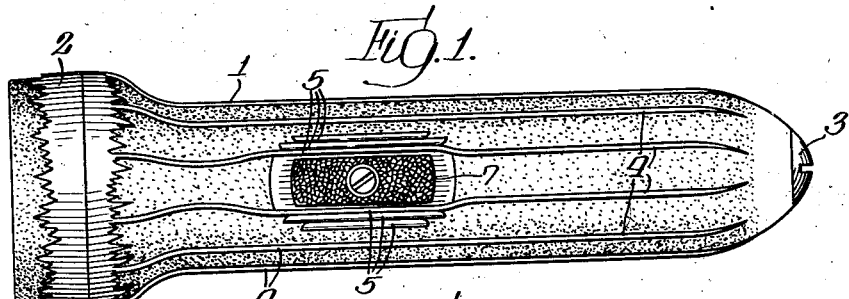
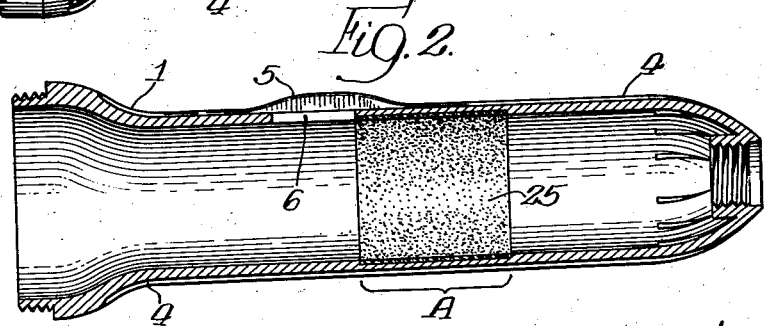
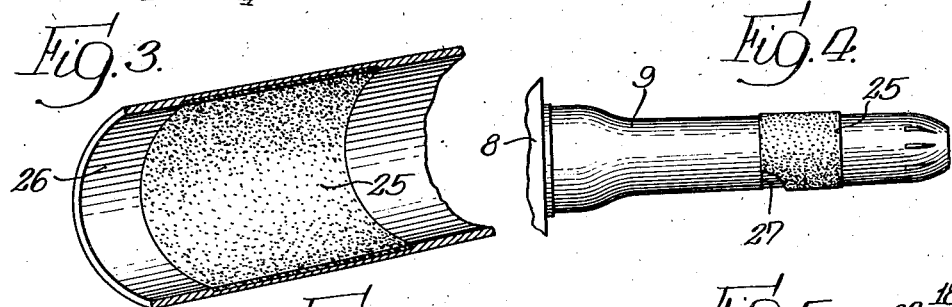
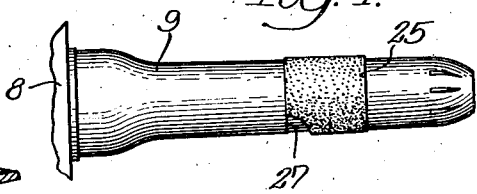
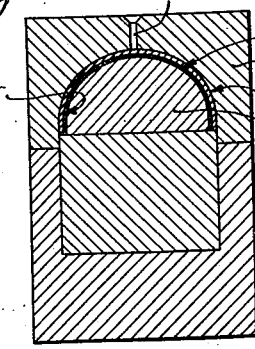
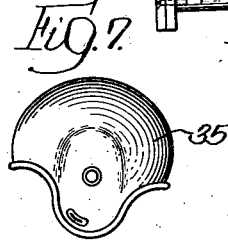
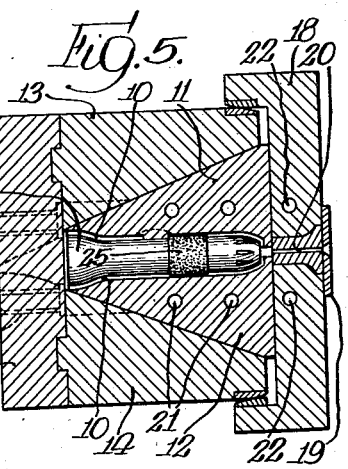
INVENTOR.
Jules P. Gits.
BY
Attys.

Patented July 31, 1945

2,380,515

UNITED STATES PATENT OFFICE 2,380,515

THERMOPLASTIC CONSTRUCTION

Jules P. Gits, Chicago, Ill., assignor, by mesne assignments, to himself and Joseph A. Gits, Chicago, Ill.

Original application December 14, 1940, Serial No. 370,111. Divided and this application May 25, 1942, Serial No. 444,379

9 Claims. (Cl. 138—76)

This invention relates to articles produced from thermoplastic material and is more specifically directed to an improved method and means for controlling the tenacity of certain types of thermoplastic articles at low temperatures without experiencing uneven shrinkage in the molding operation whereby breaks and fractures resulting from brittleness at low temperatures are effectively prevented.

The present case is a division of my copending application, Serial Number 370,111, filed December 14, 1940, as a continuation in part of copending application, Serial Number 326,372, filed March 28, 1940.

It seems that brittleness of thermoplastic materials at low temperatures is an undesirable characteristic that has caused much trouble. Inserts have been heretofore used but have proven generally unsatisfactory because they cause uneven shrinkage during the molding operation and leave shrinkage marks on the exterior surface that are very undesirable. Experience has shown that this brittleness will occur at temperatures in the neighborhood of a few degress above zero degree Fahrenheit and that when thermoplastic articles are subjected to this temperature, they will readily break or fracture if roughly handled. Experience has further shown that many articles produced from thermoplastic material are frequently exposed to these low temperatures during normal use. It has been recently discovered that flashlight barrels made of thermoplastic material would readily fracture and break under cold weather conditions and that the fracture or break would usually occur each time at the same location. The normal use of such devices in winter obviously brings them into contact with low outside temperatures and their utility as flashlight devices will only be as valuable as their ability to withstand the low temperatures. On the other hand, panel and instrument boards produced from thermoplastic material and used on motor vehicles were likewise recently discovered to fracture and break, although not subjected to blows or other strains that normally tend to damage this type of material. It was found that the vehicles had been exposed to low outside temperatures, and, under such conditions, mere road vibration was sufficient to fracture and break these thermoplastic panels.

Broadly, the invention is directed to a novel type of means and method of employing said means in the injection molding of thermoplastic materials whereby the tenacity of articles produced from these materials may be controlled to prevent breakage and fracturing resulting from brittleness at low temperatures and whereby the incorporation of said means by said method disclosed herein will effectively eliminate uneven shrinkage of the materials during the molding operation.

One object of the invention resides, therefore, in the provision of a novel method of incorporating the aforesaid means in the form of a lining or other equivalent means so as not to interfere with uniform shrinkage of the thermoplastic material while hardening whereby this material, when thus formed, will resist any tendency to break or fracture at low temperatures and articles of uniform quality and appearance may be produced therefrom.

A further object of the invention resides in the novel type of means incorporated in the molding of thermoplastic materials whereby the contraction of these materials upon hardening may be uniform and uneven shrinkage will be prevented. It is found that one form of suitable means may be a fibrous lining, fabricated in any desirable way as by weaving, felting or pressing, that allows the thermoplastic materials to contract uniformly, this form of lining preferably being devoid of an appreciable expansion and contraction upon heating and cooling, or of a degree of expansion and contraction that will interfere with the expansion and contraction of these thermoplastic materials so as not to result in uneven contraction during the molding operation.

A still further object of the invention is to provide a fibrous lining that may form, if so desired, but a small part of the wall thickness and may be inserted along the inner surface during the molding operation. In certain instances, it is sufficient to affix this lining to cover limited areas that are subjected to greater strain and therefore more apt to break or fracture at low temperatures than other portions of the device. By making this lining of a fibrous character, the fibers therein are believed to yield with respect to each other and the thermoplastic material as it contracts so as not to retard shrinkage of the material. Consequently, shrinkage marks will not appear. I believe that the lining, although thin and fibrous in character and therefore practically devoid of structural strength, tends to distribute the strain imposed upon the thermoplastic material so that a sudden blow will not locally fracture the material.

I do not wish to confuse the means and method disclosed herein with the use of fibrous filling materials, such as cotton flock, comminuted paper or pulp, shredded cloth, wood shavings and sawdust, which not only fail in their purpose materially to strengthen resinous materials against breaks or fractures resulting from brittleness produced by low temperatures but very materially interfere with the molding operations and character of the finished product. Usually, these fibrous fillers are coarse and too long to feed through extremely small passage between the sprue and mold cavity. To overcome this difficulty, the fibrous filling has been directly introduced into the mold cavity before it is closed prior to the introduction of the plastic material therein, but such procedure is not satisfactory because it materially interferes with rapidity of operation, increases costs and does not assure a uniform mixture of the fibrous filling with the plastic material. Although a uniform mechanical mixture of synthetic resin and a finely comminuted filler might be introduced through the gate passages under relatively high pressures, the final product would invariably show traces of uncovered filler as a result of the first portions of the composition forced through the gate passages under these high pressures not having sufficient resistance to flow to permit proper impregnation during the mold cavity filling cycle. It will be noted that there are many objections to introducing the filler into the plastic material during the molding operation. The finished product will have a greater density and in certain respects greater strength but the material between the interspersed filler will still be brittle at low temperatures and liable in the same degree as before to breakage and fracturing.

My improved fibrous lining advantageously allows a distribution of any strain that may be produced from a blow and the entire wall structure can thereby be protected which would not be obtained if fibrous filling is first mixed with the plastic material during the molding operation. Aside from this obvious advantage, I find that the use of my improved means further admits of simpler and cheaper molding operations which obviate troublesome steps during the transfer or injection of the plastic material into the mold cavity that obviously cause delay and increase production costs.

When the fibers of the fabric lining or insert are not impregnated by the thermoplastic material, they are free to yield with respect to each other and to the thermoplastic material so as not to retard shrinkage of the material and peculiarly to advantageously distribute any strain imposed upon the thermoplastic material by a sudden blow.

Also, my invention is concerned with the aforesaid insert or lining of a form-retaining character and particularly applicable to injection type of molding for producing cylindrical shell structures, such as flashlight barrels, formed upon mandrels in mold cavities having the heated fluid plastic material injected thereinto under relatively high pressures.

The lining or insert may be of a fabric material that readily retains its form, or of a character that first requires a preforming treatment to give it the rigidity necessary to be form-retaining, which may include a built-up structure of laminated fiber and plastic material, or fiber coated with any suitable substance which may be a plastic material such as cellulose acetate.

By making the lining or insert form-retaining, it will be impossible for the plastic material being injected to find its way under the lining or insert and thereby be raised from the mandrel or die surface against which it is positioned in the mold and forced outwardly so as to be exposed to the outer surface of the thermoplastic wall of the finished article.

As a part of the improved process herein disclosed, it is contemplated that the injection of the fluid plastic material will be made under temperature conditions keeping the temperature of the lining or insert lower than that of the injected material so that, although there is an apparent permanent bond between the lining or insert and the injected material by virtue of the pressures used, the injected material will not impregnate the lining or insert and obstruct the relative freedom of movement of the fibers of the lining or insert.

Other objects and advantages of the invention will be apparent from the following detail description when taken in connection with the accompanying drawing.

In the drawing:

Figure 1 is an elevational view of a flashlight barrel to which the present invention is adapted for the purpose of illustrating one form of embodiment thereof;

Fig. 2 is a vertical sectional view of a flashlight barrel with its end pieces and manually operable member removed;

Fig. 3 is a perspective view of a portion of the wall of the flashlight barrel to illustrate the application of the present invention to a cylindrical wall;

Fig. 4 illustrates one of the first steps in the novel method herein disclosed which involves placing the insert upon the core or mandrel and locating the same at the proper position by a tapered relation between the insert and the core, or by a shoulder on the core;

Fig. 5 illustrates a mold having a cavity for receiving the mandrel;

Fig. 6 is a sectional view illustrating the relative thickness that the lining or insert may have with respect to the body;

Fig. 7 illustrates head gear in the form of a helmet made of plastic material and embodying the present invention; and Fig. 8 illustrates the manner of placing a form-retaining insert upon the surface of a mold cavity so that it will maintain its proper position during the injection of the plastic material into the mold cavity.

For the purposes of illustration, the invention is shown first in conjunction with the molding of a cylindrical shell used, for example, as a flashlight barrel, and then in conjunction with any cylindrical member. It will be apparent, therefore, that the principle embodied may be applied to the formation of many articles and that from its broadest aspects the invention is not to be limited to any given application, although it has a unique and practical use as a backing adapted to be applied to areas that tend more readily to fracture and break.

Fig. 1 illustrates a complete shell or barrel 1 of a flashlight having a front end 2 carrying the usual lens and light bulb (not shown) and a rear tip 3 fitted as by threading so as to close off the rear end as is usually customary in this type of article. The barrel is preferably cylindrical and carries a number of batteries (not shown). It is provided with longitudinal ribs 4 and a series of raised portions 5 on opposite sides of an opening 6 through which a manually operable member 7 connects to the usual circuit making and breaking member (not shown).

Shell or barrel 1 is molded of plastic material by means of a suitable die which, for purposes of illustration, comprises a head plate 8 carrying a core 9 which extends into a mold cavity 10 formed by two wedge-shaped die members 11 and 12, slidably movable along side members 13 and 14 anchored to said head plate 8. Knockout pins 15 are adapted to lie in openings 16 provided in head plate 8 so that, through a knockout plate 17 carried at their outer ends, heads 18' on their inner ends may be forced inwardly to engage and move die members 11 and 12 whereby to spread the same outwardly and away from each other along the tapered sides of members 13 and 14.

A front plate 18 is adapted to carry sprue 19 and the usual gate 20 which communicates with mold cavity 10. When a charge of plastic material is introduced through sprue 19 and gate 20 into mold cavity 10, plate 18 is tightly held in its position, as shown in Fig. 5, so that mold cavity 10 is closed. Pressure may be maintained upon this plastic material as it is introduced until mold cavity 10 is filled. This pressure can be momentarily held upon the material to assure that the material completely fills the mold cavity. Die members 11 and 12 may be heated or cooled by hot or cold fluid flowing through passages 21, while head member 18 may be provided with passages 22 for similar purposes. If thermosetting resinous materials are used, the temperature of head member 18 will be maintained at a point sufficient to hold the materials in a plastic condition while the temperature of die members 13 and 14 will be at a higher point to effect a reaction and set the materials in the mold cavity. Transfer molding of thermosetting materials merely requires the materials to be held at the temperature keeping the materials in a plastic state in the primary or pressure chamber so that they may be readily passed into the mold cavity heated at a higher temperature to effect a reaction. If thermoplastic materials are used, the temperature of head member 18 will be high enough to hold the materials in a plastic or free flowing condition while the temperature of die members 13 and 14 will be similarly maintained until the mold cavity is filled whereupon the die members may be chilled momentarily to set the materials. It will be quite apparent, therefore, that the process herein disclosed is not limited to the type of material used. The type of material to be used will depend upon application of the invention to control the tenacity of a given product so that it will not readily fracture or break.

I have found, for example, that in flashlight barrels or shells there is a tendency for a certain area thereof to break or fracture before the remaining portion yields, and this area is shown generally as A in Fig. 2 for the construction of flashlight barrel illustrated. It seems that certain plastic materials become exceedingly brittle at low temperatures and fracture or break at this area A if subjected to strain by forces occurring through normal handling. It will be understood that the tensile strength does not necessarily become impaired but that a molecular reaction occurs that causes a brittleness which is very undesirable from a practical standpoint of use.

I find that the undesirable fracturing or breaking caused by this brittleness at low temperatures can be effectively overcome by a simple and inexpensive means in the form of a layer or sheet of shock absorbing material, preferably of a fibrous character, and may be cardboard, or the like, that is form-retaining when placed in the mold and subjected to the pressure of the plastic material being injected. This material is shown at 25 in Fig. 2. It is placed in mold cavity 10 before the plastic material is injected. After the plastic material is injected, material 25 will be embedded and firmly held in the plastic material. If used in a cylindrical structure such as a flashlight barrel, material 25 will be in the form of a sleeve and placed upon core 9 before the mold is closed. I find that core 9 may be slightly tapered, or, if desired, provided with a shoulder 27 to facilitate locating material 25 upon core 9 at area A. This material 25 may be any fibrous material, like that of cardboard, which can be fabricated to be form-retaining. It may be fabric material pressed into form like cardboard or it may be fabric material that is woven or felted and then pressed into form with a relatively compact formation of the fibers to prevent penetration of the plastic material. It is also found that penetration of the fibers can be prevented if a smooth outer surface is provided. When material 25 is not form-retaining, the pressure of the injected plastic material will cause the material either to wrinkle or roll back upon itself along the core, or the plastic material will force its way under the material and raise the same away from the core, so that this material will lie in the area of the wall and be irregularly exposed along the outer surface. In certain instances, loosely fabricated material or other non-form retaining material can be used by subjecting it to a preforming step by coating it with a layer of plastic material before placing it upon core 9. In this connection, the invention extends to any lining or insert of the kind described that can be made form-retaining for the purposes described and have a sufficient portion of its individual fibers yieldable with respect to each other and to the plastic material as it contracts and at the same time serve as a cushion to absorb a blow so as to distribute the strain imposed along the wall. Such other materials that may be used are felt, heavy paper, canvas, etc., that are in a condition of being form-retaining, or pre-treated to be form-retaining, with a relatively smooth outer surface, so that the fibrous material will be compressedly embedded in the plastic material without impregnation of the fibers restricting their freedom of movement when released from pressure and so that the fibers are free to yield to the contracting action of the plastic material.

As previously stated, the plastic material may be injected under pressure until mold cavity 10 is filled and the plastic material is forced to surround material 25 on all sides except the surface against core 9. This pressure is held momentarily until material 25 is firmly embedded on three sides whereupon it is released. The plastic material is then allowed to set, either by cooling if thermoplastic or by heating if thermosetting. When the mold parts are opened and the molded product is removed from the mold cavity, material 25 will be found to be a part of the molded product and firmly held thereby. The exposed surface contacting the surface of the mold cavity, which would be the surface contacting core 9, as shown in Fig. 5, will be smooth and flush with the inner surface of the molded product. It will be formed as part of the wall and tightly affixed thereto in recessed relation. Whether thermosetting material or thermoplastic material is used as the plastic material injected into the mold cavity to form the molded product desired, core 9 is preferably held at a temperature lower than the temperature of the injected plastic material so that material 25 will be of a lower temperature. This is also desirable where form-retaining material is added to material 25. In this manner, the lining or insert 25 is not united with the injected plastic material by a surface fusion tending to cause adhesion between the outer surface of the lining or insert and the injected plastic material, although these parts are effectively united by a permanent bonding action making it difficult to effect a separation without their destruction.

Although the plastic material may be injected into mold cavity 10 under pressure, material 25 will be firmly embedded without impregnation of its fibers to the extent of restricting their freedom of movement when the pressure is released. It is quite desirable that material 25 be of a character devoid of appreciable expansion and contraction upon heating and cooling, or at least of a degree of expansion and contraction that will not interfere with the expansion and contraction of the plastic material so as not to result in uneven contraction of the plastic material when it sets. Material 25 is in a layer that is appreciably thin with respect to the thickness of the wall carrying the same in the finished product. Its fibers may be compactly held together. It will not interfere with the contraction of the plastic material when the latter sets because the fibers thereof are free to move. Consequently, shrinkage of the plastic material will be uniform. Shrinkage marks heretofore resulting wherever inserts have been issued are eliminated.

Due to the character of material 25, any blow or exterior force brought to bear against area A of the finished product will not result in a strain fracturing or breaking the wall. The strain will be uniformly distributed by material 25. In other words, material 25 advantageously serves as a cushion to absorb the blow and thereby protect the wall from fracturing or breaking.

It is not intended that material 25 should be formed only as a sleeve as shown in Figs. 2, 4 and 5. Material 25 may be formed in pieces of any shape to conform to the contour of the inner wall surface of the finished product and of any size to protect a given area of the finished product. In Fig. 3, material 25 is shown as a backing for a limited area of an arcuate wall 26. Fig. 6 illustrates the approximate thickness of material 25 with respect to the finished wall. This thickness may vary, but I find that it may be small and very effectively accomplish the desired results.

In Figs. 7 and 8, another type of device is shown to illustrate how material 25 may be aptly used as a lining or insert and by reason of its form-retaining condition be held upon a cavity surface without being displaced by the pressure of the injected material. For the purposes of illustration, this device may be a helmet 35 of plastic material with material 25 disposed about its inner surface. Material 25 may be of a shape conforming to this inner surface so that it will rest firmly against the cavity surface of die member 36, as illustrated in Fig. 8. Outer die member 37 cooperating with die member 36 forms the cavity 38 in which helmet 35 will be formed when the plastic material is injected through sprue passage 39.

The present invention is designed to provide a simple, practical, inexpensive and very effective form of protective lining or insert of the type described that is particularly applicable to a cylindrical wall in the form of a flashlight barrel made of plastic material which normally becomes brittle under low temperatures and readily fractures and breaks, as well as a novel method of incorporating this lining or insert in a wall of this type during the molding operation. Not only is the wall reinforced against fracturing and breaking and shrinkage marks upon the exterior surface thereof prevented, but a considerable saving in the use of the plastic material results because the lining or insert may be a material that is less expensive than the plastic material and the labor used in applying it to the core before each operation, due to its form-retaining condition, is negligible.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. An article of the class described comprising a relatively thin tubular shell of plastic material and a form-retaining tube of fibrous material embedded within said tubular shell along its inner surface, said tube having a relatively smooth surface affixed to said plastic material by being compressedly embedded therein but without impregnation of its fibers, the fibers of said tube being individually yieldable relative to each other and yieldable with respect to contraction and expansion of said plastic material.

2. An article of the class described comprising a relatively thin tubular shell of plastic material and a form-retaining tube of fibrous material embedded within said tubular shell along its inner surface, said tube being compressedly embedded but without impregnation of its fibers, the fibers of said tube being individually yieldable relative to each other and yieldable with respect to contraction and expansion of said plastic material.

3. An article of the class described comprising a relatively thin shell of plastic material and a form-retaining insert of fibrous material along its inner surface, said insert having a relatively smooth surface affixed to said plastic material by being compressedly embedded therein but without impregnation of its fibers, the fibers of said insert being individually yieldable relative to each other and yieldable with respect to contraction and expansion of said plastic material.

4. An article of the class described comprising a tubular shell of plastic material and a layer of fibrous material affixed thereto along one surface and forming a component part of a wall with said tubular shell, said fibrous material being in the form of a relatively rigid body compressedly held against the plastic material without impregnation by the plastic material.

5. An article of the class described comprising a wall of plastic material and a relatively rigid body of less expensive material compressedly affixed substantially in layer form along one surface of the plastic material, said relatively rigid body having a substantial mass of fibrous material with its fibers relatively yieldable with respect to the plastic material.

6. An article of the class described comprising a wall of plastic material and cardboard affixed substantially in layer form along one surface of the plastic material, the surface of said cardboard in contact with the plastic material being relatively smooth and unimpregnated by the plastic material.

7. In combination with a tubular shell of plastic material such as a flashlight barrel, of a tube of cardboard compressibly affixed in layer form in the surface of the plastic material and tending to distribute strain imposed upon said plastic material.

8. An article of manufacture comprising a wall of plastic material characterized by a molecular change and a consequent increased brittleness when subjected to low temperatures, and a relatively thin layer of fibrous material compressedly embedded along one surface of said plastic material and having at least a substantial portion of its individual fibers relatively inert to contraction and expansion but yieldable with respect to the contracting and expanding action of said plastic material caused by temperature change, said fibrous material uniformly distributing strain imposed upon said plastic material tending to fracture or break the same particularly upon increased brittleness caused by low temperatures.

9. An article of manufacture comprising a wall of plastic material characterized by an increased degree of brittleness when subjected to low temperatures, and a relatively thin layer of fibrous material along one surface of said plastic material for distributing strain imposed upon said material to prevent fracturing and breakage thereof, said fibrous material being compressedly embedded in said plastic material but without impregnation of the fibers restricting their freedom of movement when released from pressure, said fibers being free to yield to the contracting action of said plastic material.

JULES P. GITS.